May 21, 1935.  H. ROUSE  2,002,021
SURGICAL FRACTURE EXTENSION APPLIANCE
Filed Feb. 27, 1934
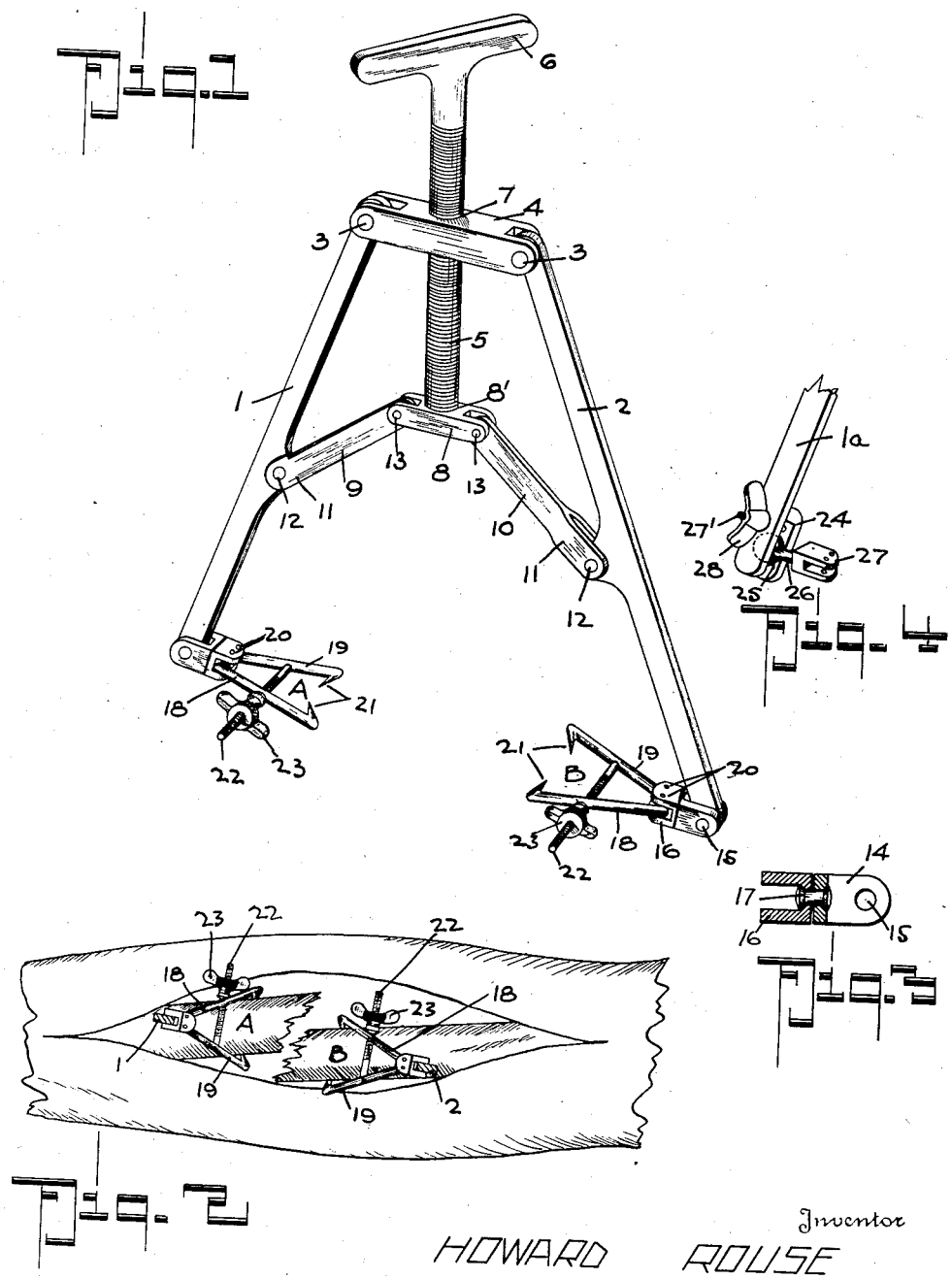
Inventor
HOWARD ROUSE
By Herbert E. Smith
Attorney Patented May 21, 1935

2,002,021

UNITED STATES PATENT OFFICE 2,002,021

SURGICAL FRACTURE EXTENSION APPLIANCE

Howard Rouse, Lewiston, Idaho

Application February 27, 1934, Serial No. 713,091

4 Claims. (Cl. 128—83)

My present invention relates to an improved surgical fracture extension appliance designed to apply stretching or extension to the limbs, for the purpose of accurately adjusting the fractured ends of the bones in the arms or legs, preparatory to the application of splice plates or similar devices to the meeting ends of the fractured bone.

As is well known in surgery, many fractures or breaks extend diagonally across the bones, and, in addition, the jagged edges project from the adjoining ends of the broken bone. These existing conditions require that the muscles of the limb must be stretched or extended, and the limb as a whole must also be extended, in order that the ends of the break may be placed in proper position to permit and insure a perfect jointing or setting of the broken or fractured parts.

In carrying out my invention I provide an appliance for the above purposes, which appliance is simple in construction and composed of a minimum number of parts; which may, with facility, be applied or attached to the fractured ends of the bone; and which may, with comparative ease, be operated to perform its functions of extending the limb. Means are also provided whereby the appliance may be manipulated, when in active position, for the purpose of removing operating parts of the appliance from the path of the surgeon in order that he may have free access to the jointed parts and freedom from obstructions during further steps in his surgical operations.

After the joint has properly been made and secured, the appliance may readily be detached from the limb, and the latter is permitted to mend.

My invention consists in certain novel combinations and arrangements of parts as will hereinafter be more specifically referred to and claimed. In the accompanying drawing I have illustrated one complete example of the physical embodiment of my invention and a slight modification thereof, wherein the parts are combined and arranged according to modes I have so far devised for the practical application of the principles of my invention. It will be understood however that changes and alterations may be made in the exemplifying structures, within the scope of my appended claims, without departing from the principles of my invention.

Figure 1 is a perspective view of the surgical fracture extension appliance embodying my invention, and shown in position for use.

Figure 2 is a detail view showing the fractured ends of a bone with the limb extended by means of my appliance, and with part of the appliance shown in section.

Figure 3 is a detail view partly in section of one of the flexible or swivel brackets forming joints for the clamps and brace.

Figure 4 is a perspective detail view of a modified form of swivel or flexible joint between the brace and the clamps.

In carrying out my invention I utilize a brace-frame similar in shape to the letter A, and comprising the spaced arms 1 and 2 that are pivoted at 3 to the cross-head 4, from which cross head the arms diverge, as shown.

A suitable screw 5, having a convenient handle 6 at one end, is threaded through a complementary hole 7 in the cross head, and the other end of the screw is journaled to turn in the spreader head 8. The spreader head 8 is located in a plane parallel with the cross head and the former is movable with relation to the latter. At 8' in Figure 1 a socket is indicated in the spreader-head in which the journal end of the screw is seated and retained, but of course permitted to turn.

A pair of spreader links 9 and 10, which are provided with bifurcated ends 11 are pivoted at 12 to the respective arms 1 and 2, and at their inner ends these links are pivoted at 13 to the bifurcated ends of the spreader-head.

Thus it will be apparent that by turning the screw 5 the spreader-head 8 may be moved away from, or toward the cross-head, for spreading or distending, and for retracting the free ends of the brace arms 1 and 2.

On the free ends of the arms 1 and 2 are mounted a pair of clamps or clamping devices, indicated as a whole by the letters A and B, and extending inwardly toward the axial line of the screw 5.

Each of the clamps A and B is mounted on an arm by means of a swivel bracket, and each swivel bracket includes a U-shaped head 14 that is pivoted at 15 to an arm, as 1 and 2. A second, oppositely arranged U-shaped head 16 is swiveled at 17 to the head 14, and as best indicated in Figure 3 the pivot 15 and the swivel bolt 17 are arranged in planes at right angles one to another, in order that the clamp as a whole may swing in a plane parallel with the arm to which it is attached, and in order that the A-frame may swing laterally on the two swivel pins or bolts 17 when the two clamps are rigidly attached to the ends of the fractured leg-bone.

In each swivel-head 16, a pair of clamp bars, as 18 and 19, are pivoted or hinged at 20, and the free end of each of these clamp bars is provided with a hooked-end 21, the hooks or barbs being arranged so that a pair of complementary hooks or barbs will engage or impinge against a bone at diametrically opposite points, as indicated in Figure 2.

The opposed points or barbs of a pair of clamp bars are brought toward one another, and clamped securely on the bone by means of a clamp bolt 22 that may be connected to one clamp bar, as 19, and which passes through the other bar as 18, the latter being provided with a slot to accommodate the threaded end of the bolt 22.

A clamp nut 23 is threaded on the free end of each clamp bolt, exterior of the bar 18, and it will be apparent that by turning the nut clockwise, the clamp bar 18 may be moved toward the bar 19, causing the opposed barbs 21, 21, to be clamped on the bone.

In Figure 4 a modified form of the swivel bracket joint between a clamp and the arm 1a is illustrated, wherein the arm is provided with a bifurcated end 24, forming a socket in which the ball or spherical head 25 is clamped. The ball is integral with a pin 26 and the latter has a U-shaped bracket head 27 in which the clamp bars (not shown) are pivoted. The metal of the bifurcated end 24 is resilient, and a bolt 27', which is fixed to one of the legs of the bifurcated end, passes freely through a hole in the other leg of the bifurcated end. A clamp nut 28 threaded on the free end of the threaded bolt 27 is used to clamp the ball in the bifurcated end, and thus holds the clamp device rigidly mounted at the free end of the arm 1a. After the clamp devices have been applied to the opposed ends of the fractured leg-bones and these ends have been adjusted properly to make the perfect joint as required, the clamp nuts 28 are loosened, and then the A-frame may be swung laterally on the two balls 25 as spaced centers, in order to remove the A-frame from the path of the further steps in the surgical operation.

From the above description it will be apparent that the appliance may readily be manipulated by turning the screw 5 to adjust the two clamps A and B into positions in order that the barbs or points 21 of the clamps may be impinged against the opposite sides of the ends of the broken bone; then, by turning the clamping nuts 23, the clamping devices are rigidly attached to the leg-bone, or to the adjoining ends of the bone, as in Figure 2. The screw 5 is now turned to extend the limb and bring the two ends of the bone into alinement and in position to make the perfect joint, and when in this position, the screw 5 is turned to close the broken joint with a perfect coordination of parts.

The A-frame may now be turned laterally, out of the way of the surgeon, and the jointed ends may be secured together, as by means of splicing plates, for a perfect setting, after which the clamps A and B are released and the appliance removed.

Having thus fully described my invention, what I claim as new and desire to secure by Letters Patent is:—

1. The combination with a cross head and a screw therein, a pair of arms pivoted to the cross head, a spreader-head in which the screw is journaled, and links pivotally connecting said spreader-head with the arms, of a pair of bracket-heads pivoted on the arms, and a pair of clamps swiveled in said bracket heads.

2. In a fracture appliance, the combination with a brace-frame including spaced arms, and means for moving the free ends of said arms toward and away from one another, of a bracket head pivoted on each arm, a swivel-head pivoted in each bracket-head, and a clamp-device mounted in each swivel-head, whereby the brace frame may be swung laterally of the clamp devices.

3. In a fracture appliance, the combination with a brace-frame including spaced arms, and means for moving the free ends of said arms toward and away from one another, of a bracket head pivotally mounted on each arm, a swivel-head pivoted in each bracket head, a pair of clamp bars pivoted in each swivel-head, barbed hooks at the free ends of said bars, and clamp bolts for closing said clamp bars.

4. In a fracture appliance, the combination with a cross head, a pair of arms pivoted on said cross head, a pair of links and a spreader-head connecting said arms, and a screw threaded in the cross head and journaled in said spreader-head, of a bracket-head pivoted at the free end of each arm, a swivel-head pivoted on each bracket-head, a pair of clamp-bars pivoted in each swivel-head, and means for adjusting said clamp-bars.

HOWARD ROUSE.